United States Patent [19]

Ishii et al.

[11] Patent Number: 4,687,683
[45] Date of Patent: Aug. 18, 1987

[54] SCINTILLATOR FOR RADIATION DETECTION AND PROCESS FOR PRODUCING THE SAME

[75] Inventors: Mitsuru Ishii, Higashiyamato; Seikichi Akiyama, Mito; Hiroyuki Ishibashi, Hitachi, all of Japan

[73] Assignee: Hitachi Chemical Co. Ltd., Tokyo, Japan

[21] Appl. No.: 640,569

[22] Filed: Aug. 14, 1984

Related U.S. Application Data

[62] Division of Ser. No. 443,034, Nov. 19, 1982, Pat. No. 4,543,485.

[30] Foreign Application Priority Data

Nov. 24, 1981 [JP] Japan ................................ 56-188824
Nov. 24, 1981 [JP] Japan ................................ 56-188825

[51] Int. Cl.$^4$ .......................... B05B 5/00; B05D 1/36; B05D 5/06
[52] U.S. Cl. .................. 427/160; 250/483.1; 250/487.1; 427/162; 427/258
[58] Field of Search .......................... 250/483.1, 487.1; 427/160, 258, 162

[56] References Cited

U.S. PATENT DOCUMENTS 4,195,230  3/1980  Ataka et al. ...................... 250/483.1
4,267,453  5/1981  Kieboom et al. ................... 250/368
4,368,390  1/1983  Takahashi et al. ............. 250/363 R Primary Examiner—Michael R. Lusignan
Attorney, Agent, or Firm—Antonelli, Terry & Wands

[57] ABSTRACT

A scintillator for radiation detection obtained by coating a light reflective material in a thickness of 50 to 150 μm by a screen printing method on the surface of a solid scintillator material substrate is excellent in uniformity, dimensional accuracy with high light output. When the light reflective material layer is covered with a synthetic resin film, adhesive strength of the light reflective material layer to the substrate is increased remarkably.

21 Claims, 6 Drawing Figures

SCINTILLATOR FOR RADIATION DETECTION AND PROCESS FOR PRODUCING THE SAME

This is a division of application Ser. No. 443,034 filed Nov. 19, 1982, now U.S. Pat. No. 4,543,485, patented Sept, 24, 1985.

BACKGROUND OF THE INVENTION

This invention relates to a scintillator for radiation detection and a process for producing the same.

As solid scintillator for radiation detection, there have been used organic crystal scintillators, plastic scintillators, glass scintillators, inorganic crystal scintillators such as bismuth germanate, zinc tungstate, cadmium tungstate, etc. (Hereinafter, the solid scintillators for radiation detection are referred to simply as "scintillators".) These scintillators are colorless and transparent, but when they are exposed to radiation such as X-rays. γ-rays, charged particles, they emit light. The wavelength of emitted light is in the range of 355 to 520 nm. The emitted light can be received by a photomultiplier tube, photo diode, etc., and by using the light-electricity conversion, radiation can be detected or the intensity of radiation can be measured. These scintillators are used in studies relating to measuring radiation such as in medical appliances and for measuring high energy particles and the like.

The scintillators are required to have a large light output and high dimensional accuracy. Thus, in order to collect the emitted light effectively in a light receiver with a larger light output, the surface of scintillator is coated with a light reflective material. As the light reflective material, there are used barium sulfate, titanium oxide, magnesium oxide, and the like. For example, powdery barium sulfate which has a high light reflectance is mixed with an organic binder and coated on the surface of the scintillator. As the coating method, there are employed a brushing method and a spraying method. But, according to these methods, the thickness of light reflective material is deviated to cause non-uniformity, which results in making the dimensional accuracy of the scintillator as a whole worse. Particularly when the degree of parallel is more than 50 μm, it becomes difficult to install the scintillator in a device. Further, when the thickness of the light reflective material is small, there bring about many disadvantages in that it is impossible to collect the emitted light of the scintillator effectively in a light receiver, the light reflective material is easily peeled off, and the like.

SUMMARY OF THE INVENTION

Objects of this invention are to provide a scintillator coated with a light reflective material in uniform thickness without losing dimensional accuracy and showing the light output of 90 or higher when an emitted light is received by a light receiver, and a process for producing the same.

This invention provides a scintillator for radiation detection obtained by coating a light reflective material in a thickness of 50 to 150 μm by a screen printing method on the surface of a solid scintillator material substrate for radiation detection, and a process for producing the same.

This invention also provides a scintillator for radiation detection obtained by coating a light reflective material on the surface of a solid scintillator material substrate and drying the light reflective material, followed by spraying and drying a synthetic resin to form a synthetic resin film on the light reflective material layer, and a process for producing the same.

DESCRIPTION OF PREFERRED EMBODIMENTS

Figure 1:
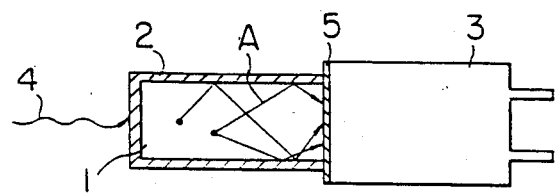
FIG. 1 is a cross-sectional side view of a scintillator and a photomultiplier tube for measuring the quantity of light.

Principle of the scintillator is explained referring to the attached drawings. FIG. 1 shows a scintillator and a photomultiplier tube for measuring the quantity of light. In FIG. 1, numeral 1 denotes a scintillator, numeral 2 a light reflective material layer, numeral 3 a photomultiplier tube, and a joint surface 5 of the scintillator 1 and the photomultiplier tube 3 is coated with a light coupling grease. When a radiation 4 is entered into the scintillator, light is emitted in the scintillator and is reflected at an end surface of the scintillator as shown by A or even if a part of the light goes outside, it returns to the scintillator again and finally reaches the photoelectric surface, and the light is converted to the quantity of electricity in the photomultiplier tube.

Figure 2:
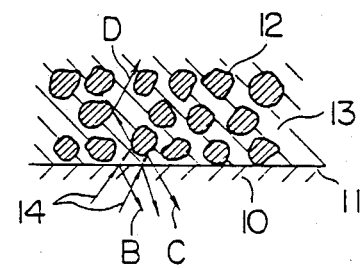
FIG. 2 is an enlarged cross-sectional view showing reflection state near the scintillator surface.

FIG. 2 shows this principle by enlarging the coating state of the light reflective material near the scintillator surface. In FIG. 2, numeral 10 denotes a scintillator, numeral 11 a scintillator surface, numeral 12 particles of light reflective material, and numeral 13 an organic binder. In the light reflective material layer containing a large amount of organic binder, the emitted light 14 is partially reflected on the scintillator surface 11 and returned to the scintillator side as shown by B. But a part of the emitted light 14 entered into the light reflective material layer is reflected by a light reflective material particle and returned to the scintillator 10 as shown by C or goes straight and is absorbed by the organic binder 13 as shown by D.

Figure 3:
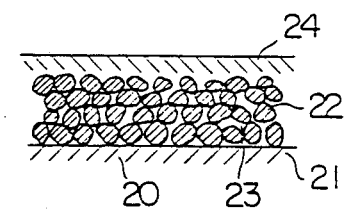
FIG. 3 is an enlarged cross-sectional view near the scintillator surface when an organic binder is small.

On the other hand, when the organic binder is present in a small amount in the light reflective material layer, since the light reflective material 22 is fixed with a small amount of the organic binder 24 as shown in FIG. 3, voids 23 are formed among the light reflective material particles 22, and thus light absorption hardly takes place in the light reflective material layer. Further, since the density of the light reflective material 22 is high, so that the emitted light is reflected and returned to the scintillator 20 side without entering into the inner side of the light reflective material layer. In FIG. 3 numeral 21 is the scintillator surface. Such a light reflective material is weak in bonding of light reflective material.

In general, when a light reflective material is coated on a scintillator material by a brushing method, the thickness of the light reflective material layer becomes at least 200 μm or more and differences in thickness also become large. On the other hand, when a light reflective material is coated by a spraying method, the thickness of the light reflective material layer can be controlled optionally but the thickness becomes non-uniform and partly too thick and partly too thin. According to these methods, there can be obtained no scintillator excellent in uniformity and dimensional accuracy and improved in performance.

Such a disadvantage can be removed by employing a screen printing method. By employing the screen printing method, the light reflective material layer of 50 to 150 μm in thickness can be formed on the scintillator material substrate. If the thickness of the light reflective material layer is less than 50 μm, the light output of emitted light from the scintillator becomes less than 90 in the quantity of light and cannot be entered into the light receiver effectively, and the light reflective material layer may easily be peeled off. On the other hand, when the thickness of the light reflective material layer is more than 150 μm, the thickness of the light reflective material layer is deviated to produce non-uniformity as mentioned above, and the dimensional accuracy of the whole scintillator including the light reflective material becomes worse and the installation of the scintillator into a device also becomes difficult.

As the scintillator material substrate, there can be used organic crystal scintillators, plastic scintillators, glass scintillators, inorganic crystal scintillators such as bismuth germanate, zinc tungstate, cadmium tungstate, etc.

As the light reflective material, there can be used $BaSO_4$, $TiO_2$, $Al_2O_3$, $MgO$, etc. These light reflective materials may be used alone or as a mixture thereof.

These light reflective materials are made into a paste together with one or more organic binders such as ethyl cellulose, and an organic solvent such as terpineol, etc. The resulting paste is coated on the surface of the scintillator material substrate by a conventional screen printing method. There is no particular limit to the mesh size of the screen but it is preferable to use a screen having a mesh size of 50 to 300 mesh.

After coating the paste containing the light reflective material by the screen printing method, the paste is dried by a conventional method to give the desired scintillator.

In order to improve the adhesive strength of the light reflective material layer to the scintillator material substrate and prevent the light reflective material layer from undesirable influence of moisture, a synthetic resin layer is formed on the light reflective material layer.

As the synthetic resin, there can be used an epoxy resin, an acrylic resin, a urethane resin, etc.

The synthetic resin layer can be formed preferably by a spraying method. That is, a synthetic resin is dissolved or suspended in an organic solvent or liquid medium to give a solution or suspension, which is sprayed on the light reflective material layer and dried to give the synthetic resin layer. The thickness of the synthetic resin layer is not limited but preferably in the range of 50 to 150 μm.

Figure 6:
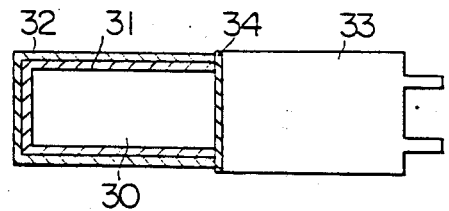
FIG. 6 is a cross-sectional side view of a scintillator covered by a light reflective material layer and a synthetic resin film and a photomultiplier tube for measuring the quantity of light.

The thus obtained synthetic resin coated scintillator can take a structure as shown in FIG. 6. For example, on the surface of a scintillator material substrate 30, a light reflective material layer 31 in 0.2 mm thick is formed by a screen printing or brushing method, and further a synthetic resin (epoxy resin) layer 32 in 0.01 mm thick is formed by a spraying method. The thus obtained scintillator is joined to a photomultiplier tube 33 via a joint surface 34 to form a radiation detector. As mentioned above, the light reflective material layer can be formed in this case by any conventional methods such as a brushing method, spraying method, but a printing method, particularly a screen printing method is more preferable considering the uniformity, dimensional accuracy and high performance.

This invention is illustrated by way of the following Examples, in which all parts and percents are by weight unless otherwise specified.

EXAMPLE 1

Figure 4:
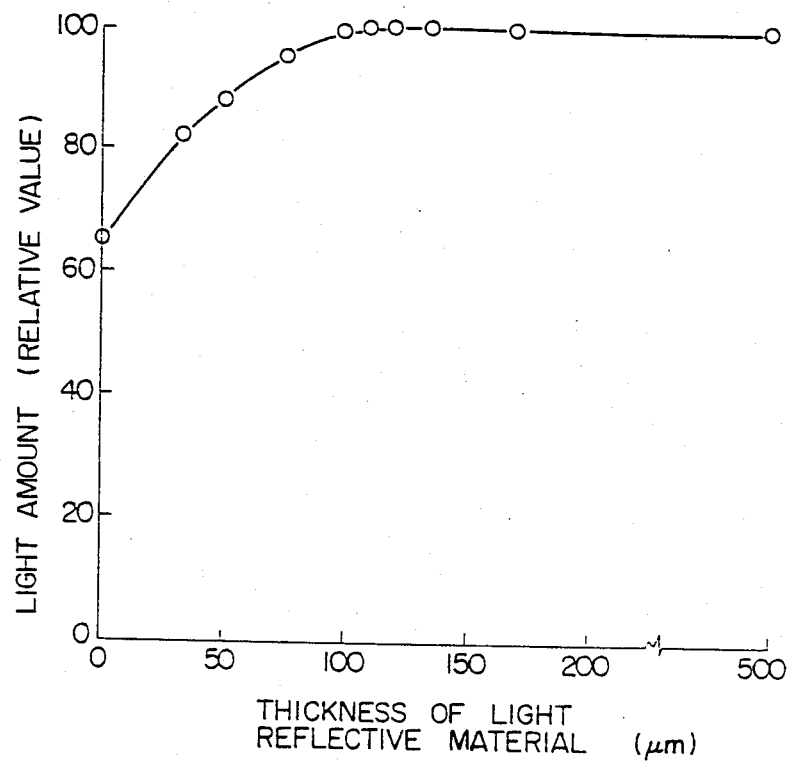
FIG. 4 is a graph showing a relationship between the thickness of light reflective material and the quantity of light.

On the surface of a BGO ($Bi_4Ge_3O_{12}$) scintillator having a size of 12×20×30 mm, a paste obtained by mixing 70% of $BaSO_4$ powder, 3% of ethyl cellulose and 27% of terpineol was coated by a screen printing method (mesh size 100 mesh) so as to give various thickness as shown in FIG. 4 and dried.

Figure 5:
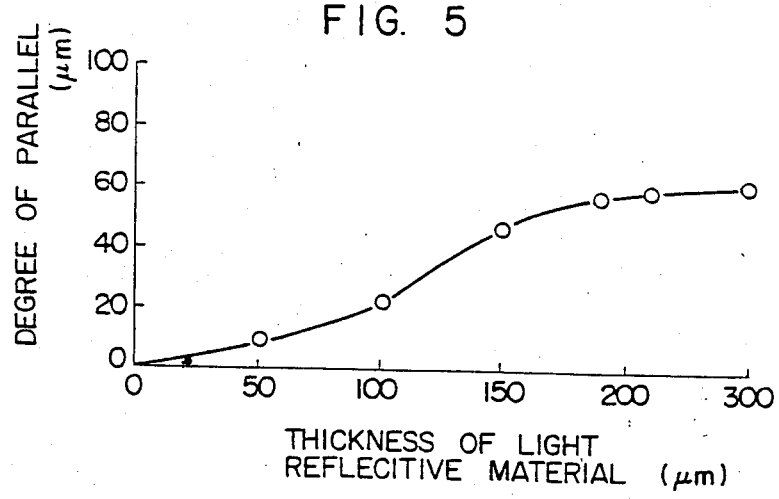
FIG. 5 is a graph showing a relationship between the thickness of light reflective material and the degree of parallel.

Using the thus produced scintillators, scintillation properties were measured. The results are as shown in FIG. 4. In FIG. 4, the light amount (the quantity of light) in terms of light output (relative value) of the photomultiplier tube is taken along the ordinate axis and the thickness of light reflective material along the abscissa axis. The thickness of the light reflective material layer can be increased by repeating the screen printing method a plurality of times. FIG. 5 shows the degree of parallel among whole dimensions of the scintillators shown in FIG. 4.

As is clear from FIG. 4, the scintillation properties are saturated when the thickness of the light reflective material layer becomes 100 μm or more. On the other hand, the dimensional accuracy of the printing is increased with an increase of the thickness of the light reflective material layer and the degree of parallel becomes 50 μm or more when the thickness of the light reflective material layer is over 150 μm.

Therefore, in order to have good scintillation properties and dimensional accuracy, the thickness of the light reflective material layer should be in the range of 50 to 150 μm.

As mentioned above, when the light reflective material layer is formed on the surface of the scintillator material substrate by the screen printing method in 50 to 150 μm thick, the degree of parallel becomes 50 μm or less and the light output becomes 90 or more when the emitted light is entered into the light receiver. Thus, there can be obtained a scintillator for radiation detection which can enter the emitted light effectively into the light receiver.

EXAMPLE 2

As the scintillator material substrate, bismuth germanate having a size of 15×20×30 mm was used. On the surface of scintillator material, a mixture obtained by mixing barium sulfate having an average particle size of 0.5 μm and ethyl cellulose in proportions as shown in Table 1, followed by mixing of 40 parts of terpineol with 100 parts of the resulting barium sulfate mixture, was coated by a screen printing method. The thickness of the light reflective material layer was 150 μm. To obtain such a thickness, the printing and drying (at 230° C.) were repeated. By the drying, the terpineol was evaporated and decomposed, so that only the ethyl cellulose was retained in the light reflective material layer as the organic binder.

In Table 1, light outputs from photomultiplier tubes (relative values) and adhesive states of light reflective material layers to the substrates are also listed. As is clear from Table 1, when the amount of ethyl cellulose becomes smaller, the larger the light output, but there is a tendency to lower the adhesive strength of the layer. When the amount of ethyl cellulose is 3% or less, the light reflective material layer becomes extremely brittle.

In the next place, scintillators having a light output (relative value) of 90 or more and ethyl cellulose in an amount of 10% or less in the light reflective material layer were coated with an epoxy resin. The epoxy resin was dissolved in a conventional thinner and sprayed on each light reflective material layer, followed by curing at 150° C. The thickness of the epoxy resin film was about 10 μm.

By the epoxy resin film coating, each light reflective material layer was adhered to the substrate strongly and peeling of the light reflective material layer did not take place at all during the handling. There was no change in the light output of each scintillator before and after the treatment of the resin film coating.

TABLE 1

| Run No. | Amount of $BaSO_4$ (%) | Amount of ethyl cellulose (%) | Light output (relative value) | Adhesive strength of the layer |
| --- | --- | --- | --- | --- |
| 1 | 80 | 20 | 70 | Strongly adhered |
| 2 | 85 | 15 | 85 | " |
| 3 | 90 | 10 | 90 | Not so strongly adhered |
| 4 | 95 | 5 | 95 | Not so strongly adhered |
| 5 | 97 | 3 | 98 | Easily peeled off |
| 6 | 98 | 2 | 99 | " |
| 7 | 99 | 1 | 100 | Extremely brittle |
| 8 | 100 | 0 | Impossible to measure | " |

As mentioned above, in the coating of the light reflective material layer so as to make the light output of scintillator maximum, when the amount of organic binder is lowered, adhesive strength of the light reflective material layer becomes lower. But, this can be improved by coating a synthetic resin film such as epoxy resin film thereon to form a double layer structure, the inner layer exhibiting mainly a light reflection effect, and the outer layer exhibiting mainly an adhesion effect. Such a structure is very effective from the viewpoint of practical production and practical use.

As mentioned above, when a light reflective material having a larger refractive index is coated on the surface of scintillator material substrate and dried, followed by spraying of a synthetic resin thereon and drying, there can be obtained a scintillator wherein the light reflective material is strongly adhered to the substrate even if the amount of organic binder is small and which can give a high light output from the photomultiplier.

What is claimed is:

1. A process for producing a scintillator for radiation detection which comprises coating a mixture comprising a light reflective material, an organic binder and an organic solvent on the whole surface of a solid scintillator material substrate, other than a surface to be in contact with a light receiver, by a screen printing method, and drying the mixture to give a light reflective material of 50 to 150 μm thick.

2. A process according to claim 1, wherein the substrate of solid scintillator material is a scintillator selected from the group consisting of an organic crystal scintillator, a plastic scintillator, a glass scintillator, and an inorganic crystal scintillator.

3. A process according to claim 2, wherein the inorganic crystal scintillator is made of a material selected from the group consisting of bismuth germanate, zinc tungstate and cadmium tungstate.

4. A process according to claim 1, wherein the light reflective material is selected from the group consisting of $BaSO_4$, $TiO_2$, $Al_2O_3$, and MgO.

5. A process for producing a scintillator for radiation detection which comprises:
coating a mixture comprising a light reflective material, an organic binder and an organic solvent on the whole surface of a solid scintillator material substrate other than a surface to be in contact with a light receiver;
drying the mixture to form a light reflective mterial layer;
coating a synthetic resin solution on the light reflective material layer; and
drying the synthetic resin to form a synthetic resin film on the light reflective material layer.

6. A process according to claim 5, wherein the synthetic resin is selected from the group consisting of an epoxy resin, an acrylic resin, and a urethane resin.

7. A process according to claim 5, wherein the mixture comprising a light reflective material, an organic binder and an organic solvent is coated by a screen printing method.

8. A process according to claim 5, wherein the light reflective material is selected from the group consisting of $BaSO_4$, $TiO_2$, $Al_2O_3$ and MgO.

9. A process according to claim 5, wherein the scintillator material substrate is made of a material selected from the group consisting of bismuth germanate, zinc tungstate and cadmium tungstate.

10. A process according to claim 5, wherein the mixture is coated on the surface of the solid scintillator material substrate and dried to give a light reflective material 50 to 150 μm thick.

11. A process according to claim 7, wherein said screen printing is performed using screen having a mesh size of 50 to 300 mesh.

12. A process according to claim 1, wherein said mixture is coated on the surface of the solid scintillator material substrate and dried to provide a thickness thereof such that a degree of parallel of 50 μm or less and a light output (relative value) of at least 90 for emitted light to be entered into the light receiver is obtained.

13. A process according to claim 12, comprising the further step of placing a light receiver in contact with the surface of said substrate adapted to be in contact with a light receiver.

14. A process according to claim 5, wherein said synthetic resin solution is coated on the light reflective material layer by a spraying method.

15. A process according to claim 5, wherein said mixture is coated on the surface of the solid scintillator material substrate and dried to provide a thickness of the light reflecting material coating such that a degree of parallel of 50 μm or less and a light output (relative value) of at least 90 for emitted light is obtained.

16. A process according to claim 1, wherein a synthetic resin layer is formed on the light reflective material to improve adhesion of the light reflective material to the substrate.

17. A process according to claim 16, wherein the synthetic resin is selected from the group consisting of an epoxy resin, an acrylic resin, and a urethane resin.

18. A process according to claim 1, wherein said screen printing is performed using screen having a mesh size 50 to 300 mesh.

19. A process according to claim 5, comprising the further step of placing a light receiver in contact with the surface of said substrate adapted to be in contact with a light receiver.

20. A process according to claim 1, comprising the further step of placing a light receiver in contact with the surface of asid substrate adapted to be in contact with a light receiver.

21. A process according to claim 1, wherein the screen printing is performed a plurality of times so as to provide the thickness of the light reflective material.

* * * * *